(12) United States Patent
de Jong

(10) Patent No.: US 6,612,798 B2
(45) Date of Patent: Sep. 2, 2003

(54) APPARATUS FOR DELIVERING LARGE CONTAINERS OF GOODS, ESPECIALLY WAREHOUSED GOODS, TO AN OUT-PROCESSING STATION OR TRANSFER STATION

(75) Inventor: Leen-Pieter de Jong, Varsseveld (NL)

(73) Assignee: Nedcon Magazijninrichting b.v. (NL)

( * ) Notice: Subject to any disclaimer, the term of this patent is extended or adjusted under 35 U.S.C. 154(b) by 0 days.

(21) Appl. No.: 09/864,549

(22) Filed: May 23, 2001

(65) Prior Publication Data
US 2003/0035708 A1 Feb. 20, 2003

(30) Foreign Application Priority Data
May 23, 2000 (EP) .................................. 00110883
Mar. 31, 2001 (DE) .......................... 101 16 164

(51) Int. Cl.[7] .............................................. B65G 47/34
(52) U.S. Cl. ...................................... 414/276; 414/286
(58) Field of Search .............................. 414/276, 286; 198/465.3, 750.1, 750.2, 750.14

(56) References Cited
U.S. PATENT DOCUMENTS

| | | | |
|---|---|---|---|
| 3,924,718 A | | 12/1975 | Kornylak .................. 193/35 R |
| 4,662,511 A | | 5/1987 | Greener |
| 5,123,517 A | * | 6/1992 | Windau .................. 193/35 SS |
| 5,228,819 A | * | 7/1993 | Hammond ............... 198/774.4 |
| 5,285,909 A | * | 2/1994 | Slater ......................... 211/151 |
| 5,350,270 A | * | 9/1994 | Stallard et al. ............. 211/151 |
| 5,393,188 A | * | 2/1995 | Scott et al. ................. 211/151 |
| 5,605,427 A | * | 2/1997 | Hammond ............... 193/35 SS |
| 5,727,669 A | * | 3/1998 | Rich, Jr. .................. 198/468.6 |
| 5,868,541 A | * | 2/1999 | Tajima et al. ............ 198/774.2 |

FOREIGN PATENT DOCUMENTS

| | | | |
|---|---|---|---|
| EP | 173346 | * 3/1986 | .................. 414/286 |
| EP | 0 225 722 A1 | 6/1987 | |
| EP | 0343837 | 5/1989 | |
| EP | 0888983 | 1/1999 | |
| GB | 349298 | 5/1931 | |
| GB | 502851 | 3/1939 | |
| GB | 915508 | 1/1963 | |

* cited by examiner

*Primary Examiner*—James W. Keenan
(74) *Attorney, Agent, or Firm*—R W Becker & Associates; R W Becker

(57) ABSTRACT

An apparatus is provided for delivering large containers of goods, especially warehoused goods, such as pallets, to an out-processing station or to a transfer station. The apparatus includes an inclined delivery segment that leads to the out-processing station or transfer station and that has at least two tracks arranged essentially parallel that leave an intermediate space. At least one cart is arranged in each track. The carts form a first cart pair, whereby the carts run on wheels and have a bearing surface, whereby a large container can be placed on the bearing surfaces of the cart pair. Large containers can be moved using the inventive apparatus while avoiding the disadvantages of conventional roller tracks, such as pressing rollers into the wood on the underside of pallets and thereby causing the pallets to become stuck. A transport means, for instance a forklift in an article handling apparatus, can access the intermediate space left between the tracks so that a large container located in the delivery segment can be retrieved therefrom at any time and can, for instance be returned to storage.

19 Claims, 13 Drawing Sheets

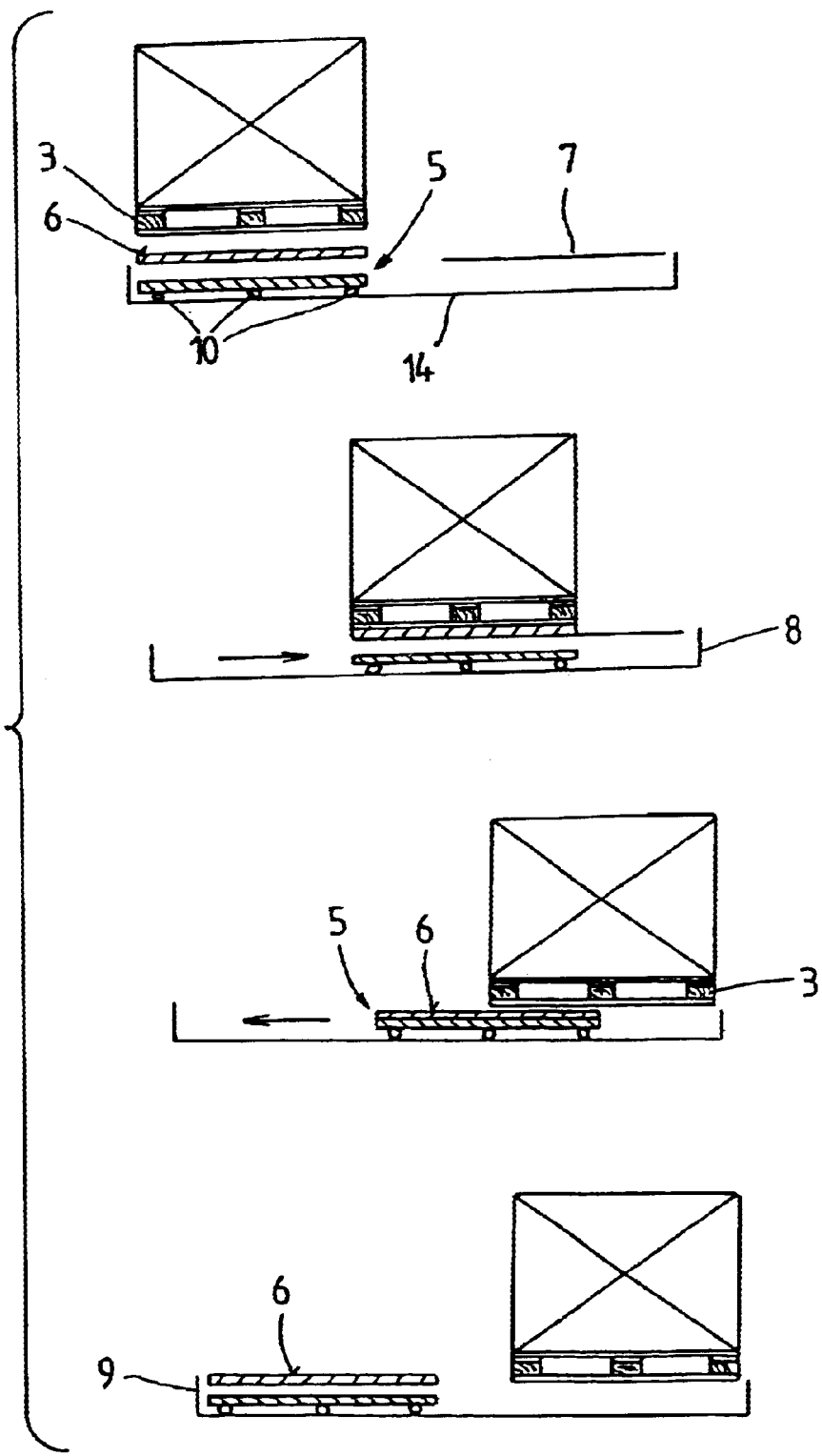

APPARATUS FOR DELIVERING LARGE CONTAINERS OF GOODS, ESPECIALLY WAREHOUSED GOODS, TO AN OUT-PROCESSING STATION OR TRANSFER STATION

BACKGROUND OF THE INVENTION

The present invention relates to an apparatus for delivering large containers of goods, especially warehoused goods such as pallets, to an out-processing station or transfer station, and includes an inclined delivery segment that leads into the out-processing station and that has at least one conveyor means for moving the large containers.

When warehousing goods or similar articles it is generally customary to consolidate those goods that are small in volume in larger containers, these containers then being stored separately, for instance on racks or shelves. Large containers in the context of this invention are especially pallets, wire cages, boxes, and similar containers that are suitable for receiving a plurality of small articles.

When a certain number of articles that have been combined in large containers need to be removed from storage, it is necessary to remove the large container from storage, for instance from the rack, to open the large container, and to remove the desired number of articles that are to be taken out of storage. This process is also known as out processing, whereby the articles combined in the large containers are called warehoused goods.

Usually the large containers are delivered to an out-processing station for this purpose, at which station the actual out-processing is then performed manually or automatically.

Known during transport of large containers on pre-specified conveyor segments is providing transfer stations at which the containers are removed from a conveyor segment and forwarded for further transport for instance, on a different conveyor segment to another transport means, or are even forwarded by conventional transport means such as by truck.

Known in prior art is removing the large container from storage using appropriate aids, for instance an article handling apparatus, placing it on a delivery segment that leads into the out-processing station or transfer station, and then transporting it via transport means to the out-processing station or transfer station.

The gravity exerted by the large container itself can be used to move the large container along the delivery segment. Provided for this is a delivery segment that is inclined to the horizontal and that has a roller conveyor as transport means. The large container, such as a pallet, is first placed on the roller conveyor at the beginning of the delivery segment and, due to its own gravity, moves along the individual rollers of the roller conveyor in the direction of the out-processing station or transfer station to which the delivery segment leads. Once there, out-processing of the desired quantity of articles can begin, or the large container is transferred, as described above. In the case of out-processing, if the large container is completely emptied, it is removed from the out-processing station and another large container can be delivered along the delivery segment. The same applies when a transfer takes place.

Furthermore known is dimensioning the delivery segments such that above the out-processing station one or more large containers, such as pallets, can be set aside and which, once the large container located in the out-processing station or transfer station has been processed and removed or transferred out of the out-processing station, can be transported into the out-processing or transfer station, which is now unoccupied. The advantage of such a solution is that this system can realize the so-called first-in/first-out technique, in which a large container that is the first placed on the delivery segment is also the first to be out-processed or transferred. This is particularly important for articles with limited shelf-life, since, due to their limited shelf-life, care must be taken that the articles that are placed in storage first are the first to be removed from storage in order that a maximum tolerable period of time is not exceeded.

It has been determined that in particular in connection with palletized goods, there are particular problems associated with the delivery segments that have roller conveyors integrated therein and that work using gravity. The various commonly-used pallets (such as the Europallet or the GMA pallets conventionally used in the United States) are usually made of wood. When a pallet is in the transfer or out-processing station of the known apparatus that has roller conveyors, and if another pallet has been placed on the roller conveyor in a wait position, the weight produced by the palletized goods places a load on the wood forming the underside of the pallet that is in contact with the rollers of the roller conveyor. This causes the rollers of the roller conveyor to press into the relatively soft wood of the pallet. If the out-processing of the pallet that is in the out-processing station lasts for an extended period, or if the out-processing is interrupted by a break in work for an extended period (for instance, a weekend), or if the pallet remains in the transfer station for an extended period until it is transferred, the rollers of the roller conveyor can press relatively deep into the wood on the underside of the pallet. Then, if the pallet located in the transfer or out-processing station is emptied and/or removed, and if the next pallet set on the roller conveyor in the direction of the transfer or out-processing station is to follow, it is possible that the rollers of the roller conveyor have been pressed so far into the wood on the underside of the pallet that the pallet can no longer automatically move over the rollers of the roller conveyor. On the contrary, it can be retained in its position by the rollers that are pressed into the wood.

Instead of the pallet moving in the direction of the transfer or out-processing station due to its own gravity, as provided, additional measures must now be undertaken. In the worst case scenario, when even additional force exerted on the pallet does not release the pressed-in rollers of the roller conveyor from the underside of the pallet, the pallet must be at least partially out-processed then and there, i.e., on the delivery segment, so that it is possible to move the pallet in the direction of the transfer or out-processing station by removing weight from it.

Not only do such occurrences interrupt transfer or out-processing operations, they also tie up resources that have to be used to release the pallet that is stuck on the roller conveyor.

U.S. Pat. No. 5,350,270 provides one alternative to the roller conveyors described in the foregoing. This patent suggests using a cart that runs on an inclined track in order to move palletized goods along a delivery segment. The cart is formed by a frame and extends largely across the entire width of the delivery segment, which is approximately equal to the width of the pallet to be delivered. The cart has two axles with wheels, of which two run on a right-hand track and two run on a left-hand track. The problems associated with roller tracks that occur as described in the foregoing can be avoided with this known apparatus. However, since the cart extends across the entire width of the delivery segment and also across the entire width of the pallet, it is not possible with this solution to retrieve, using a transport device such as, for instance, a forklift on an article handling device, a pallet that is currently situated in the delivery segment and that was removed from the wagon and placed there. This is because such a forklift on an article handling device would be blocked by the cross-struts of the cart frame.

However, it is frequently necessary to remove, for instance, large containers that have been partially out-processed from an out-processing station and to return them to storage. It is desirable to perform this process in a manner that is as automated as possible.

SUMMARY OF THE INVENTION

Thus the object of the invention is to further develop a known apparatus such that large containers located in the delivery segment can be simply and advantageously returned with an article handling device.

To achieve this object, the invention suggests an apparatus for delivery of large containers of goods, in particular warehoused goods, to an out-processing station or transfer station, and comprises:

an inclined delivery station that leads to the out-processing station or transfer station, which delivery station has at least two tracks arranged essentially parallel leaving an intermediate space, and at least two carts forming a cart pair, whereby each of said carts, which run on wheels, is arranged in one of the tracks for movement along the track; whereby said carts each have support or bearing surfaces, and whereby a large container can be placed upon the bearing surfaces of the cart pair.

Since, instead of a wide cart embodied across the entire width of the delivery segment, a cart pair is used that is arranged to leave a free intermediate space, the intermediate space or area thus available can be used to move in a transport means for retrieving a large container from the out-processing or transfer station or from the delivery segment. If a large container that has been introduced into the delivery segment for some reason must be removed therefrom, an article handling device with a forklift, for instance, can reach into the intermediate space between the tracks, take the large container, and convey it out of the delivery segment and back into a storage system, for instance. Such a design also minimizes the manual labor that has to be performed and enhances the flexibility of the facility.

In accordance with one advantageous further development of the invention, the apparatus has a stop or deposit device in the out-processing station or transfer station onto which a large container can be moved. The large container that has been brought to the out-processing station or transfer station is then moved from the cart onto the deposit device. The carts are thus then free to receive another large container.

In accordance with another advantageous further development of the invention, for moving the large container onto the deposit device, the bearing surfaces of the carts are each height-adjustable with respect to the distance to the wheels of the cart. In this manner the large container located on the bearing surfaces of the carts of the cart pair can be removed by lowering the bearing surfaces to the deposit device motion. In order to initiate lowering or raising of the bearing surface of the carts, the tracks can each have a stop at a first end and at a second end, which stops trigger a change in the distance between the bearing surfaces of the carts and their wheels when the carts strikes the stops. In accordance with an additional advantageous further development of the invention, for raising or lowering the surfaces of the carts, the carts can each have a base element on which the wheels are arranged and a carrier element that is displaceable relative to the base element and on which the bearing surface is arranged, whereby arranged on each of the base elements and carrier elements are slide members that are provided with inclined faces and that engage one another; displacement of the base element and carrier element relative to one another causes the height of the bearing surfaces to be adjusted. Such slide members are designed such that, when the carrier element or bearing surface is raised, the slide members lie against each other such that there is no displacement toward the lowered position. Displacement, and therefore lowering of the carrier element, due to mass inertia does not occur until the stop is struck.

In accordance with another advantageous further development of the invention, the tracks are formed by U-shaped profile tracks with a base and two legs arranged essentially perpendicular to said base, whereby the wheels of the cart run on the base. The cart located on this track is laterally guided by the legs due to the U-shaped embodiment of the tracks. The cart runs to some extent in a "channel" in which it is guided optimally. In tracks thus embodied, a deposit device for a large container can be embodied simply by outwardly angled bevels in the legs. These bevels impart to the U-shaped profile additional stability against torsional moment, while they also form a simple and stable deposit device. For tracks embodied in this manner, the bearing surfaces of the carts, the height of which bearing surfaces can be adjusted between a lowered position and a raised position, should be embodied such that they lie below the bevels of the legs when in the lower position and above the bevels of the legs when in the raised position. In this manner the large container located on the bearing surfaces can be moved onto the bevels by simply lowering the bearing surfaces of the carts.

A single cart pair suffices if the inventive apparatus is to be embodied in a length appropriate for simultaneously receiving two large containers. A second cart pair is required for an apparatus embodied for simultaneously receiving three large containers. This cart pair also includes two carts, each of which has wheels and a bearing surface. The carts can each run on the tracks for the first carts; the tracks should be embodied larger as appropriate. In addition, second tracks for the second cart pair can be provided adjacent to the first tracks. The only critical factor is that the space left between each of the tracks for the first and/or second cart pair is sufficient so that a transport means, for instance a forklift on an article handling device, can penetrate into this intermediate space and retrieve a large container placed in the apparatus.

For an apparatus designed for three pallets with two cart pairs, in accordance with one advantageous further development of the invention it is provided that the height-adjustable bearing surfaces of the first cart pair are higher in their raised position than the bearing surfaces of the second cart pair in their raised position. In this manner, if both cart pairs are located in a starting position at the beginning of the delivery segment or at the beginning of the tracks, a large container can be moved onto the higher bearing surface of the first cart pair; the second cart pair remains undisturbed in the wait position at the beginning of the delivery segment.

It is not until the first cart pair is not located in the wait position at the beginning of the delivery segment that a large container can be moved onto the raised bearing surfaces of the second cart pair and conveyed together therewith in the direction of the out-processing or transfer station.

In order to return the carts to a starting position after moving the large container out of the out-processing or transfer station, these are connected to a retrieval means that exerts a force on the carts in the direction away from the out-processing or transfer station, which retrieval means returns the carts without large containers placed thereupon to the starting position at the beginning of the track. This retrieval means can be, for instance, a spring, preferably a helical spring, that is connected to the beginning of the track at one end and to the cart at the other. Potential retrieval means include general energy-accumulating apparatus, such as, for instance, a rubber band, or retrieval means operated by means of accumulation of electrical energy. However, the retrieval means can also be weights connected to the carts via cable means, said weights being suspended from the tracks via a reverse at the upper end of the tracks. In this case the weight of the weights is used as the retrieving force.

The incline of the delivery segment, and thus of the tracks, should be selected depending on the carts used such that the weight of the large container on the components arranged parallel to the delivery segment is sufficient to overcome the friction between the carts and the tracks as well as the friction of the bearings of the wheels on the carts and to produce a weight-actuated drive in the direction of the out-processing station or transfer station. Care must be taken that the component of the weight in the direction of the delivery segment or tracks does not become so great that the large container being transported reaches an excessive speed. Otherwise this could lead to damage to the goods in the large container if there is abrupt braking. In order to be able to transport large containers of different weights in the inventive apparatus, as the invention suggests, it is advantageous for the incline in the tracks to be adjustable by incline adjustment means. Such incline adjustment means can be, for instance, spring-elastic compressable supports on the higher starting end of the tracks. These give more when large containers that are heavy are placed on the carts at the beginning of the tracks than when those large containers that are not as heavy are placed thereupon, so that less of an incline is set for large containers that are heavy than for large containers that are lighter in weight. In this manner largely uniform, moderate transport speed can be achieved when the spring-elastic compressable supports are designed appropriately.

BRIEF DESCRIPTION OF THE DRAWINGS

Additional advantages and features of the invention result from the exemplary embodiments described using the attached drawings, in which:

FIG. 3 illustrates the structure of an inventive apparatus for delivering large containers of goods, especially warehoused goods, to an out-processing station or transfer station in four different positions;

DESCRIPTION OF PREFERRED EMBODIMENTS

Figure 1A:
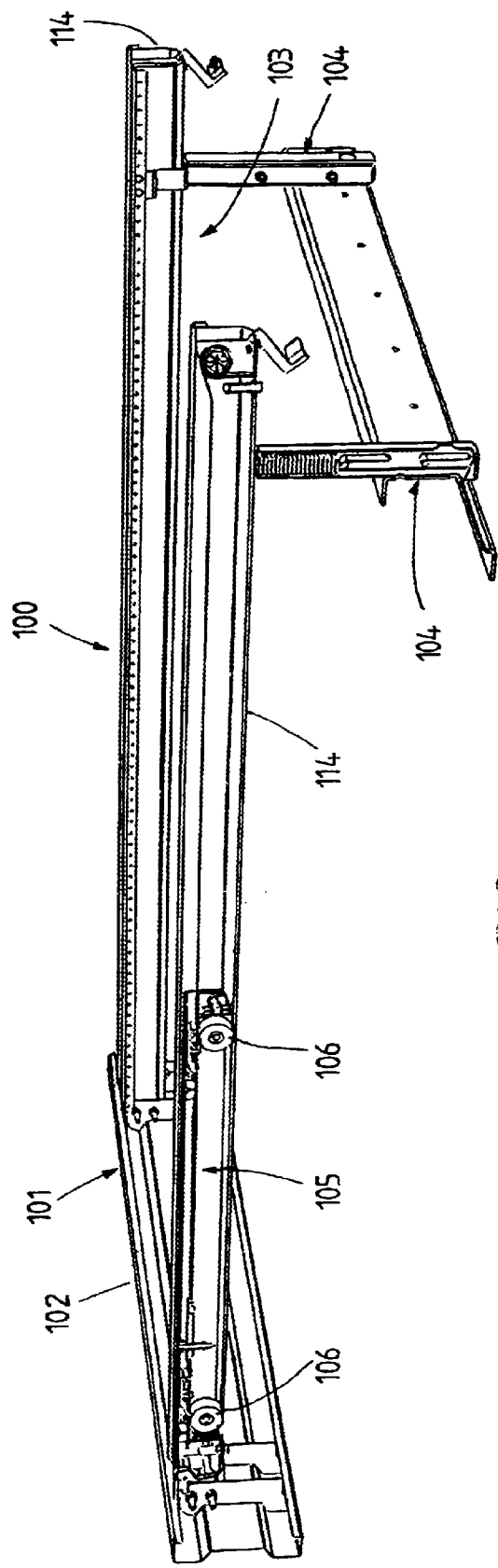
FIG. 1a is a perspective illustration of an inventive apparatus for delivering large containers of goods to an out-processing or transfer station with carts located in the out-processing or transfer station.

FIG. 1a is a perspective drawing of an inventive apparatus 100. Two inclined tracks 114 arranged essentially parallel to one another form a delivery segment. The tracks 114 lead at their lower ends into an out-processing or transfer station 101. Left between the tracks 114 is an intermediate space 103 into which, for instance, an article handling device (not shown) reaches with a forklift and thus can receive and return large containers located in the apparatus. The front track 114 is shown partially cut away in the illustration. A cart or carriage 105 can be seen in this track 114 in the out-processing or transfer station 101. The cart 105 runs on wheels 106 in the track 114.

The higher ends of the tracks 114 are borne such that their height can be adjusted via spring-elastic compressable supports 104. The tracks 114 are embodied in a U-shape with a base and two opposing legs that essentially run perpendicular to the base, whereby the legs have in their end regions bevels (123 in FIG. 1c) that form a deposit device for a large container.

Figure 1B:
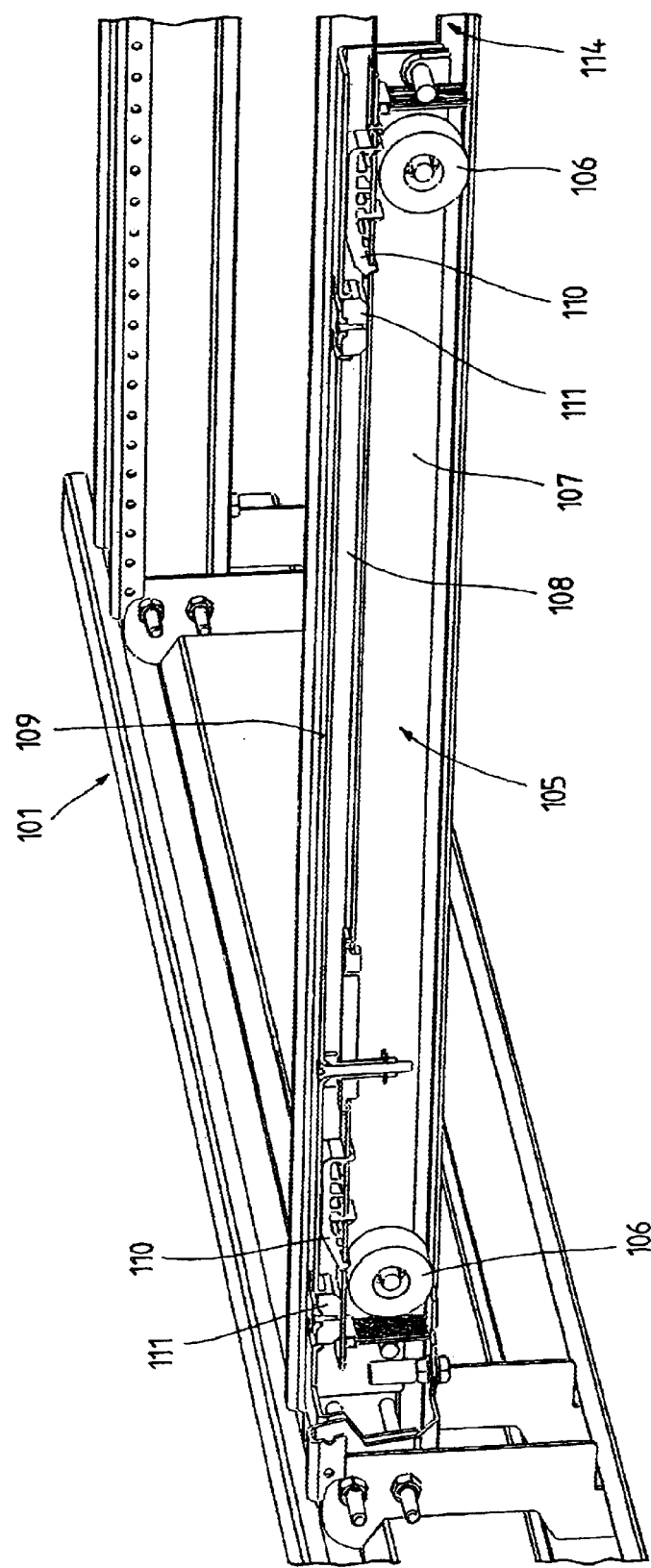
FIG. 1b is an enlargement of a section of FIG. 1a with the out-processing or transfer station.
Figure 1C:
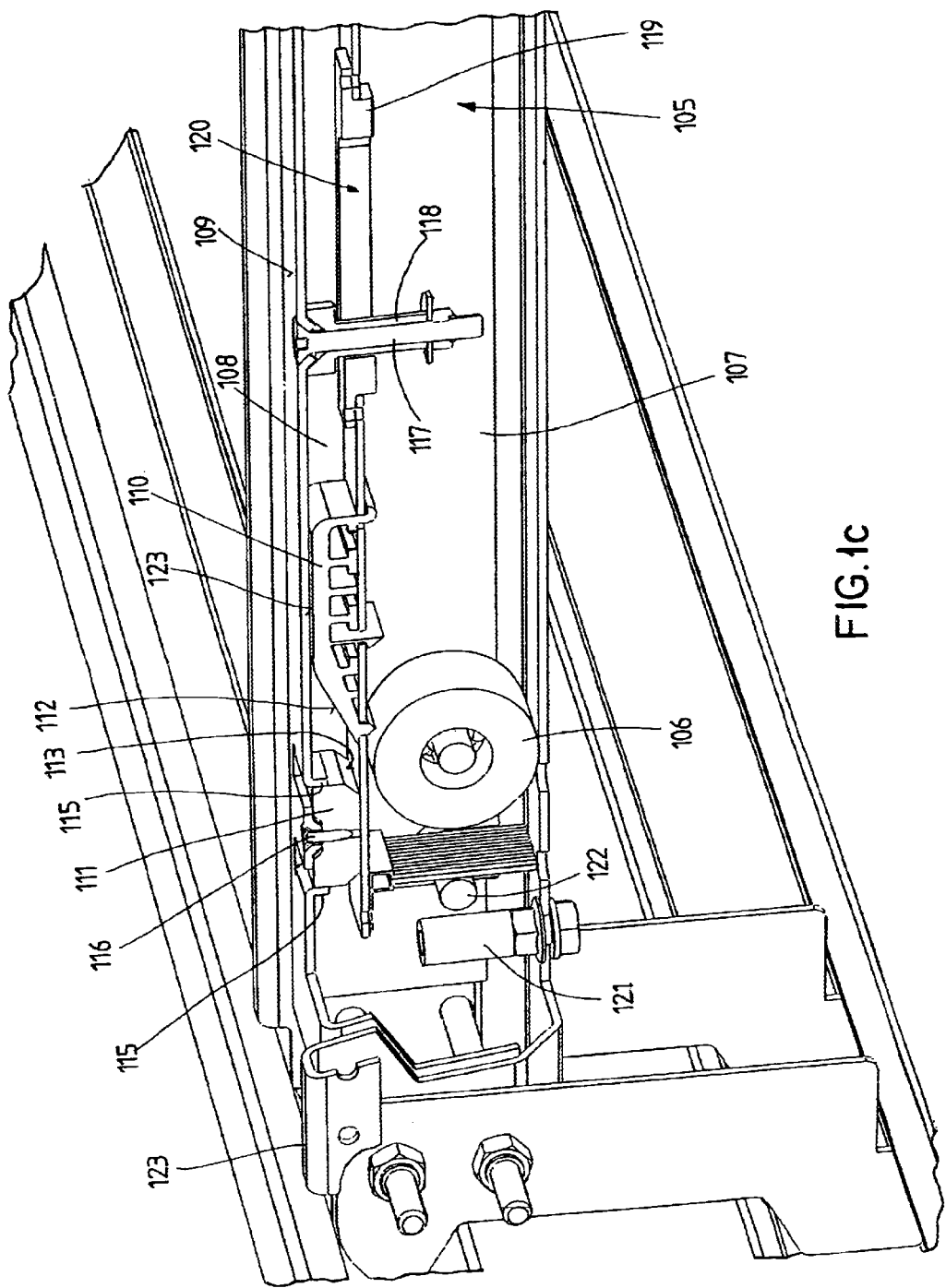
FIG. 1c is an enlarged section of FIG. 1b with the part of the cart shown on the left in FIG. 1b.

FIGS. 1b and 1c are enlarged sections from FIGS. 1a and 1b, respectively. FIG. 1b illustrates a cut-away view of the cart 105 running in the front track 114 in the out-processing or transfer station 101. The cart 105 comprises a base element 107 and a carrier element 108. The height of the base elements 107 and carrier element 108 can be adjusted relative to one another. Formed on the upper side of the carrier element 108 is a support or bearing surface 109 on which a large container can be placed when the carrier element 108 is in the raised condition. Base element 107 and carrier element 108 are each embodied as U-shaped metal profiles, whereby the carrier element 108 is disposed in an inverted position over the base element 107. The base element 107 carries the wheels 106 on axles joined to the base element 107. Base element 107 and carrier element 108 each have two slide members 110 and 111. The slide members of the elements each face the other element and the glide or slide members 110 and 111 are situated such that they cooperate in opposing pairs. The precise design of the slide members can be seen in the enlargement in FIG. 1c.

The slide member 110 is joined to the base element 107. For this purpose the base element 107 has on its top side transverse slots in which the extensions on the slide member 110 engage, the projections being embodied with locking projections for locking the slide member to the base element 107. The slide member 110 has an inclined face 112 that leads to a level surface 133 that is parallel to the upper surface of the base element 107. The slide member 111 is joined to the carrier element 108 by means of a bolt 116. The slide member 111 is also held by material bevels 115 embodied in the carrier element 108, which bevels fix the slide member 111 in the longitudinal direction of the cart 105. The slide member 111 also has an inclined face 113. In the position illustrated here, the carrier element 108 of the cart, and therefore the bearing surface 109, is shown in a lowered position. The slide members 110 and 111 are arranged in the longitudinal direction of the cart 105, spaced apart from one another, whereby the slide member 111 lies on the base element 107 of the cart 105. Carrier element 108 and base element 107 of the cart 105 are displaceable relative to one another inside a pre-set limit in the longitudinal direction of the cart 105. This pre-set limit is determined by a slot 120 embodied in a slide guide 119 arranged in the base element 107. A bolt 117 that is joined to the carrier element 108 and that is guided through a sleeve 118 engages the slot. The sleeve 118 and the bolt 117 can be moved back and forth in the slot 120 in the longitudinal direction of the cart 105, wherein they determine the maximum relative displacement in the longitudinal direction between base element 107 and carrier element 108. In this figure, the sleeve 118 is located at the left-hand end of the slot 120. For limiting the movement of the cart in the downward direction of the track 114, a stop 121 is arranged on the track and a counterstop 122 is arranged on the cart 105. The stop 121 in this exemplary embodiment is formed simply by a bolt with a sleeve placed thereover, for instance a sleeve made of plastic or rubber; the counterstop comprises a pin fixed on the cart 105.

In the situation illustrated in FIGS. 1a through 1c, the carts 105 running in the tracks 114 have arrived in the out-processing station 101 and the bearing surfaces 109 are lowered. A large container originally placed on the cart is now placed on the bevels 123 of the tracks 114; the carts can return to their starting position using spring energy.

Figure 2A:
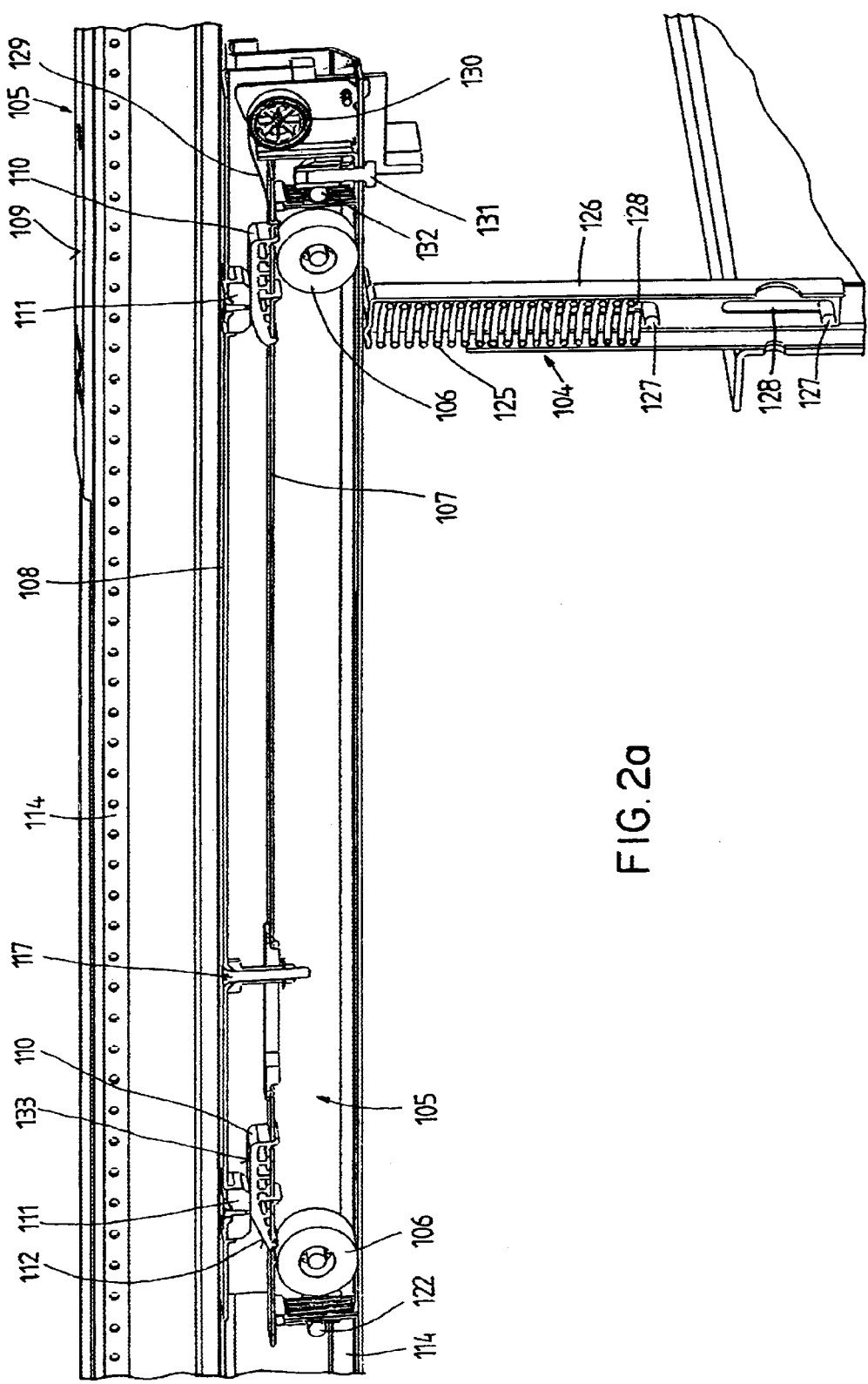
FIG. 2a is a section of the apparatus in accordance with FIG. 1, but with the cart located at the beginning of the tracks.
Figure 2B:
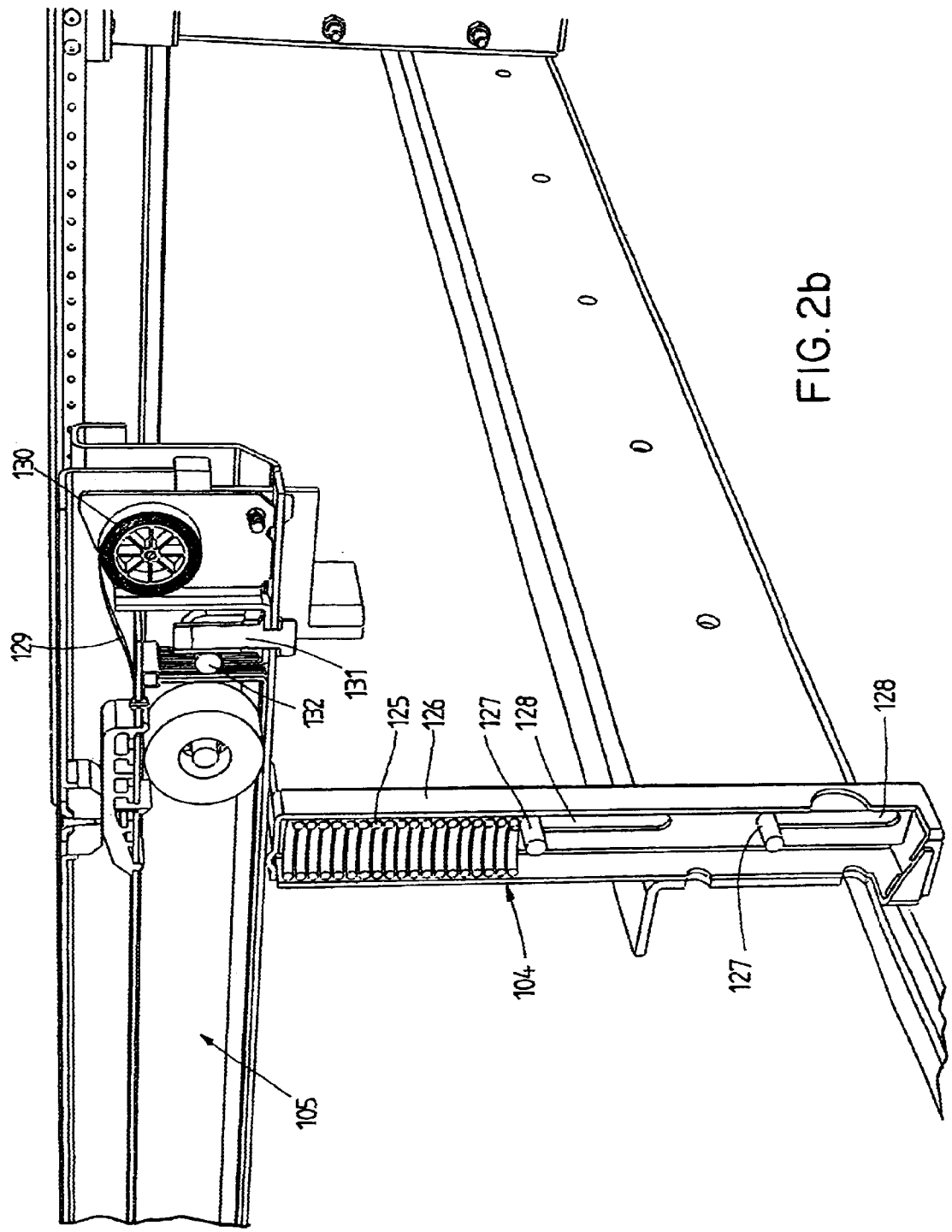
FIG. 2b is an enlarged section of the apparatus similar to that in FIG. 2a, but with compressed support.
Figure 2C:
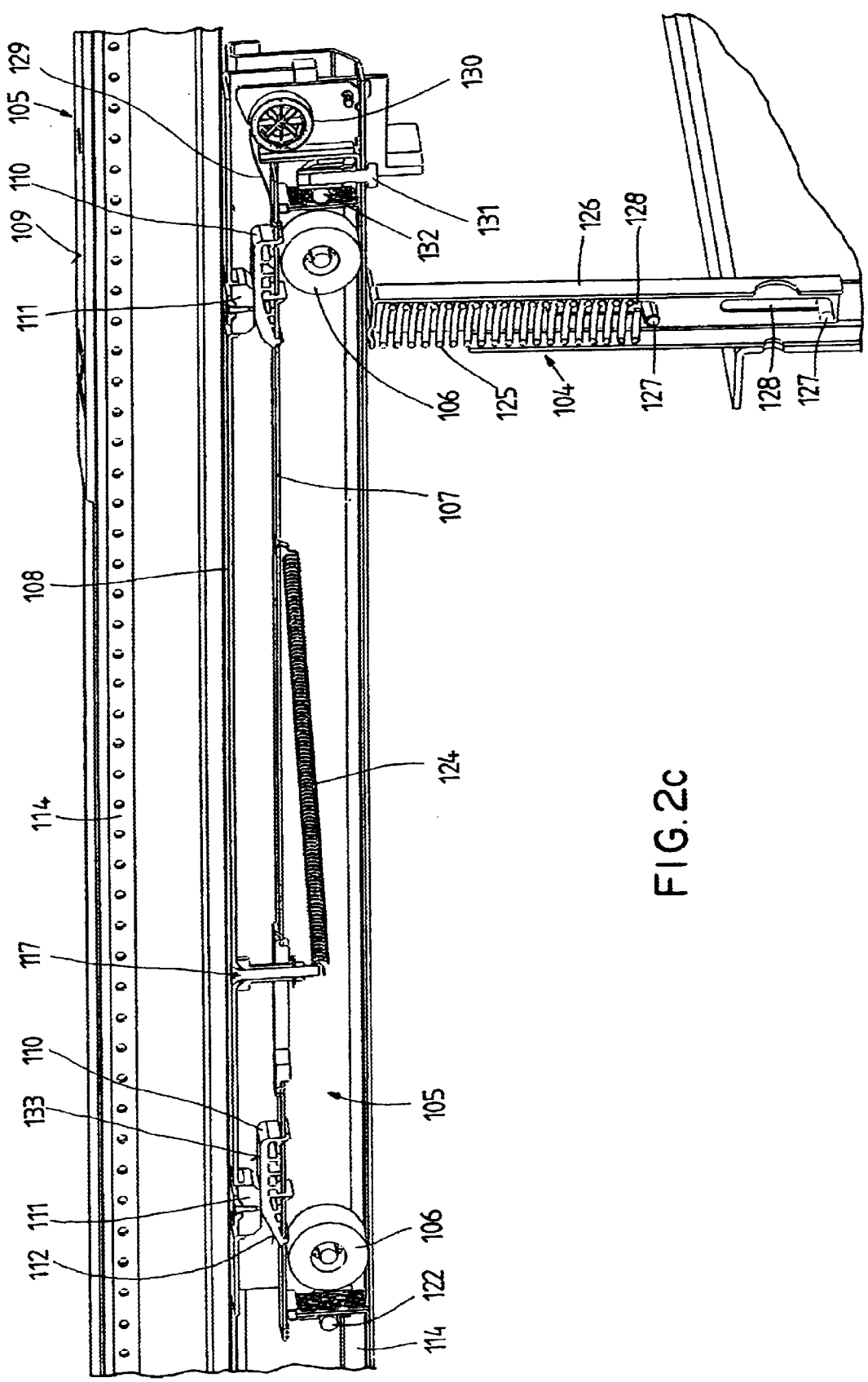
FIG. 2 c in an embodiment that is an alternative to FIG. 2a, is a section of the apparatus in accordance with FIG. 1 with an additional spring between base element and carrier element of the cart.

This situation is illustrated in FIGS. 2a through 2c. In these drawings, the carts 105 are shown in the starting position at the higher end of the tracks 104. The carrier elements 108 of the carts 105 are located in the raised positions. For this to happen the slide member 111 joined to the carrier element 108 has run up the inclined face 112 of the slide member 110 and rests on its level surface 133. In this position the bearing surfaces 109 of the cart 105 project out over the legs of the track 114 and a large container can be placed on the cart.

In the position illustrated in FIGS. 2a through 2c, the cart 105, at a counterstop 132 arranged at the end on the right in the drawing, which counterstop is embodied as a pin like the counterstop 122 at the other end of the cart 105, strikes a stop 131 joined to the track 114. The stop 131 can be formed like the stop 121 by a bolt with a sleeve thereover, for instance a plastic or rubber sleeve.

A spring 129 for the cart 105 shown in the drawing can also be seen in this drawing; it runs on a roller 130. The roller 130 unwinds this spring 129 when the cart 105 travels along the tracks 114 in the direction of the out-processing or transfer station 101. If the large container is removed from the cart, the spring energy drawing the cart back to the starting position exceeds the weight of the cart so that the spring rewinds on the roller 130 and returns the cart 105 to its starting position.

If a large container is placed on the raised bearing surfaces 109 of the cart 105, the friction between the slide members 110 and 111 is so great that the slide element 108 and therefore the bearing surface 109 remain in the raised position. The carts roll with the large container placed thereupon to the ends of the tracks 114 in the direction of the out-processing or transfer station 101. Once there, the carts, at their counterstops 122, strike the stops 121. Due to the mass inertia of the carrier elements 108 and the large container placed thereupon, these cannot follow the abrupt stop of the cart 105 so that the carrier elements of the cart 105 move further in the direction of the downward incline of the tracks 114. This overcomes the friction between the slide members 110 and 111; the carrier elements 108 displace relative to the base elements 107. The slide members 111 slide down the inclined face 112 of the slide members 110 and the carrier elements 108 are lowered. The bearing surfaces 109 now travel to the position illustrated in FIGS. 1a through 1c, below the level of the bevels 123, and the large container is deposited on the bevels. Released from the load of the large container, the spring energy of the spring 129 pulls the carts back in the direction of the starting position at the upper end of the tracks 114. Once there, their counterstops 132 again strike the stops 131, whereby a relative movement relative to the base element 107 in the direction of the upper end of the tracks 114 is carried out due to the mass inertia of the carrier elements 108. The slide members 111 again slide up the inclined faces 112 of the slide members 110 and the carrier elements 108 and therefore the bearing surfaces 109 are raised again.

FIG. 2c illustrates an alternative embodiment of a helical spring 124 arranged between the base element 107 and the bolt 117 joined to the carrier element 108. The force exerted on the carrier element due to the mass inertia when the cart strikes the upper stop in the track 114 can be augmented by means of this helical spring 124. This helical spring 124 is arranged such that it exerts a force acting in the direction of the upper end of the tracks 114 on the carrier element 108 relative to the base element 107. This supports the raising of the carrier element 108 so that this process occurs more reliably.

In FIGS. 2a through 2c, the spring-elastic support 104 is shown in two different positions. In FIGS. 2a and 2c the spring-elastic support 104 is shown in its highest raised position. The spring-elastic support comprises a square conduit 126 and a helical spring 125 arranged therein. The square conduit 126 has longitudinal holes or slots 128 arranged in the axial direction into which project mandrels 127 that are joined securely to a frame. These mandrels 127 act as a guide for the square conduit 126, which can be displaced relative to the mandrels; in addition, the upper mandrel 127 acts as a support for the helical spring 125. The helical spring 125 is inserted between the upper mandrel 127 and the end of the square conduit 126 connected to the tracks 114. It exerts on the higher end of the track 114 a pressure force that urges this end of the tracks 114 to raise and therefore to maximize the angle of inclination of the tracks 114. In the situation illustrated in FIGS. 2a and 2c, the spring-elastic support 104 is shown in a position at maximum height. This position is assumed when the cart is not loaded or when it is loaded with large containers that are very light in weight. If the cart 105 is loaded with a large container that is heavier, the weight exerted thereby causes the helical spring 125 to be compressed, the spring-elastic supports 104 are compressed, and the incline of the tracks 114 is reduced. In very heavy loads, the situation shown in FIG. 2b occurs, in which the spring 125 is maximally compressed and the mandrels 127 strike the upper end of the slots 128. In this situation, the incline of the tracks 114 is minimized. Depending on the weight of the loads placed on the cart 105, a weight-dependent incline in the tracks 114 is set between the illustrated extremes by the elastically compressable supports 104. Thus, the optimal incline in terms of conveyor speed is always set for loads of various weight; there are no excessive conveyor speeds that could jeopardize goods located in the large containers.

FIG. 3 illustrates one option for the embodiment with a pair of carts 5. It is shown in four different operational positions. A cart 5 runs on tracks 14 of the inclined delivery segment, at the end of which is a deposit device 7. The cart has rollers 10 by means of which it can be moved with low friction on the tracks. The cart has a bearing surface 6, the height of which can be adjusted between two positions. If the cart is at the beginning of the tracks, a pallet 3 can be placed upon the bearing surface 6, and gravity causes the cart to move, as shown in the second diagram, in the direction of the deposit device 7. A stop 8 is provided at the end of the tracks. If the cart 5 with the pallet 3 rolling down the inclined tracks strikes the stop 8, the bearing surface 6 lowers, and the pallet 3 with the warehoused goods located thereupon is moved onto the deposit device 7. The third diagram in this figure illustrates the situation in which the cart 5 with the lowered bearing surface 6 returns to the starting position. Another stop 9 is located in the starting position; it causes the bearing surface 6 to be raised when the cart strikes this stop 9. The cart is now ready to receive another pallet.

Figure 4:
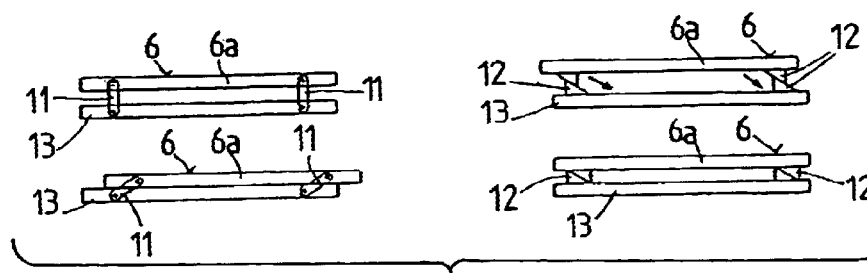
FIG. 4 illustrates two different exemplary embodiments for a lowering mechanism for adjusting the height of the bearing surface of a conveyor cart in the invention.

FIG. 4 illustrates two different ways to make it possible for the height of the bearing surface 6 of the cart 5 to be adjusted. The first option illustrated here is to connect the bearing surface 6 formed on a carrier element 6a to a base element 13 via two rigid coupling members 11 that are attached in an articulated manner to both the base element 13 and the carrier element 6a. This embodiment is illustrated in both the raised position and in the lowered position. The second option illustrated here for the lowering mechanism is to connect the base element 13 to the bearing surface 6 via slide members 12. The slide members 12 have slide surfaces inclined to the carrier element 6; when the slide members are displaced relative to each other, the carrier element 6a, and therefore the bearing surface 6, moves to a raised or lowered position relative to the base element 13. This embodiment is also illustrated in both the raised position and in the lowered position.

Figure 5A:
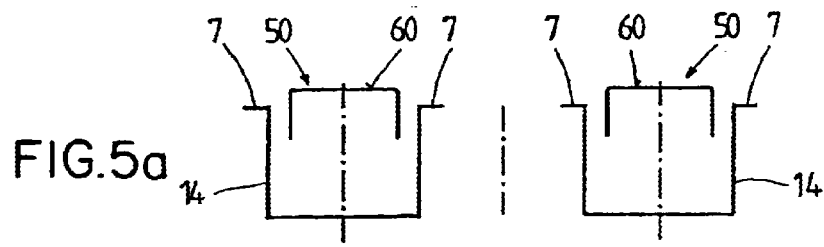
FIGS. 5 and 5b are schematic representations of an embodiment of an inventive apparatus with two parallel-running carts for a two-pallet system.
Figure 5B:
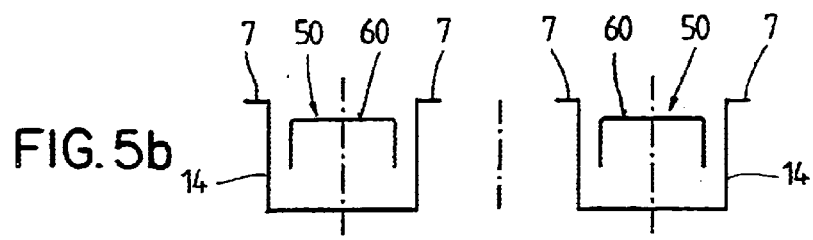

FIGS. 5a and 5b illustrate one possible embodiment of the delivery segments provided with carts for a two-pallet system. The delivery segment has two parallel and adjacent tracks 14 for carts or carriages 50 running mutually independent and parallel. Together the carts constitute a cart pair. The tracks 14 in this example are U-shaped and at each of the vertical legs have outward-guided bevels 7 for the deposit device. FIG. 5a illustrates the situation in which the carts 50 are located in the starting position. In terms of height, the bearing surfaces 60 of the carts 50 project over the bevels in the tracks 14 that act as a deposit device. Thus a pallet can be placed on the two deposit or bearing surfaces 60 of the carts 50, and the carts can be moved with the pallet placed thereupon or with another large container in the direction of the transfer or out-processing station. FIG. 5b illustrates the situation in which the bearing surfaces 60 of the carts 50 are lowered. A pallet (not shown) is moved to the bevels 7 of the tracks 14 acting as the deposit device 7, and the carts 50 return without the pallets to the starting position, where their bearing surfaces 60 are raised again.

Analogous to FIGS. 5a and 5b, FIGS. 6a through 6c illustrate a solution for the three-pallet system. Again, two parallel tracks 14 are arranged along the delivery segment, whereby in this case two carts 510 and 511 with corresponding bearing surfaces 610 and 611 are provided in each track. Together the carts 510 and 511 constitute a first or second cart pair.

Figure 6A:
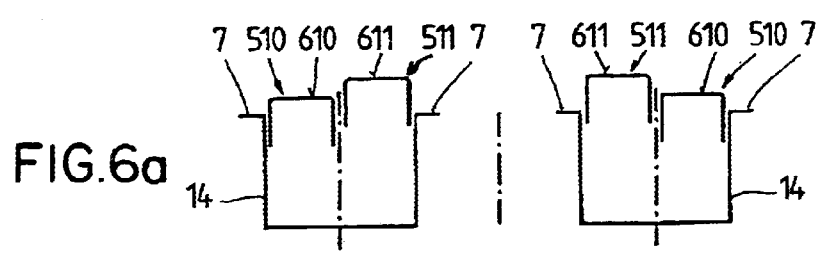
FIGS. 6a through 6b are schematic representations of an embodiment of an inventive apparatus with two parallel-running cart pairs in a three-pallet system.
Figure 6B:
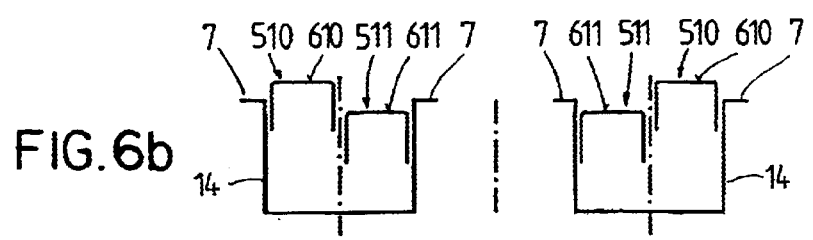
Figure 6C:
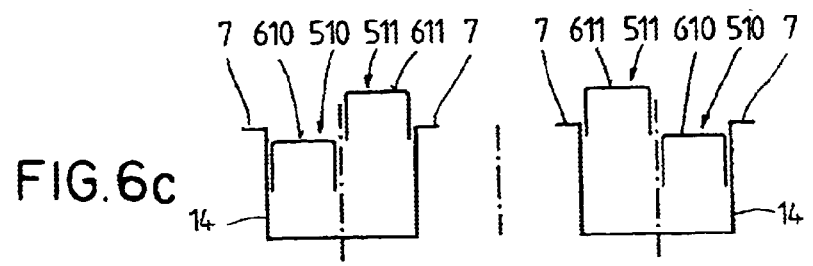

The tracks are also U-shaped in this case, and at the end of their vertical legs have outwardly projecting bevels 7 acting as a deposit device for pallets or other large containers. FIG. 6a illustrates the starting position in which all bearing surfaces 610 and 611 for carts 510 and 511 are in the raised position. It should be noted that the bearing surfaces 611 of the interior cart pair of carts 511 are higher than the bearing surfaces 610 of the exterior cart pair of carts 510. Thus a pallet or other large container introduced into the apparatus would be placed onto the bearing surfaces 611 of the carts 511 and the carts 511 would move with the pallet placed thereupon or with another large container in the direction of the transfer or out-processing station. If the interior cart pair 511 is not located in the starting position, but rather is in a wait position with the large container placed on the bearing surfaces 611, a large container then introduced can be placed onto the bearing surfaces 610 of the cart pair 510.

FIG. 5b illustrates how the bearing surfaces 611 of the interior cart pair 511 in the lowered condition are located below the level of the bevels 7 of the legs of the U-shaped guide tracks 14 acting as a deposit device. A pallet transported on the bearing surfaces 611 into the out-processing station is now moved onto the bevels 7, and the carts 511 are returned to their starting position. It should be noted that the bearing surfaces 611 of the carts 511 are clearly lowered below the level of the bearing surfaces 610 of the exterior carts 510 so that the carts 511 can be moved with no problem under any pallet that has been moved to the bearing surfaces 610 located with the carts 510 in a wait position.

FIG. 5c illustrates the reverse situation in which the bearing surfaces 610 of the exterior carts 510 are lowered below the level of the bevel 7 and below the level of the raised bearing surfaces 611 of the carts 511 so that the carts 510, after the pallet or another large container has been deposited in the transfer or out-processing station, can be returned with no problem to the starting position. In the starting position, the lowered bearing surfaces 610 and 611 of the exterior cart pair of the carts 510 or of the interior cart pair of the carts 511 are returned to the raised position.

In FIGS. 5a through 6c it should be noted that there is an intermediate space between the tracks 14 into which a functional element, for instance a forklift, of an article handling device (RBG) can be introduced in order to lift a pallet or other large container in the system and, for instance, return it to a storage rack.

Figure 7A:
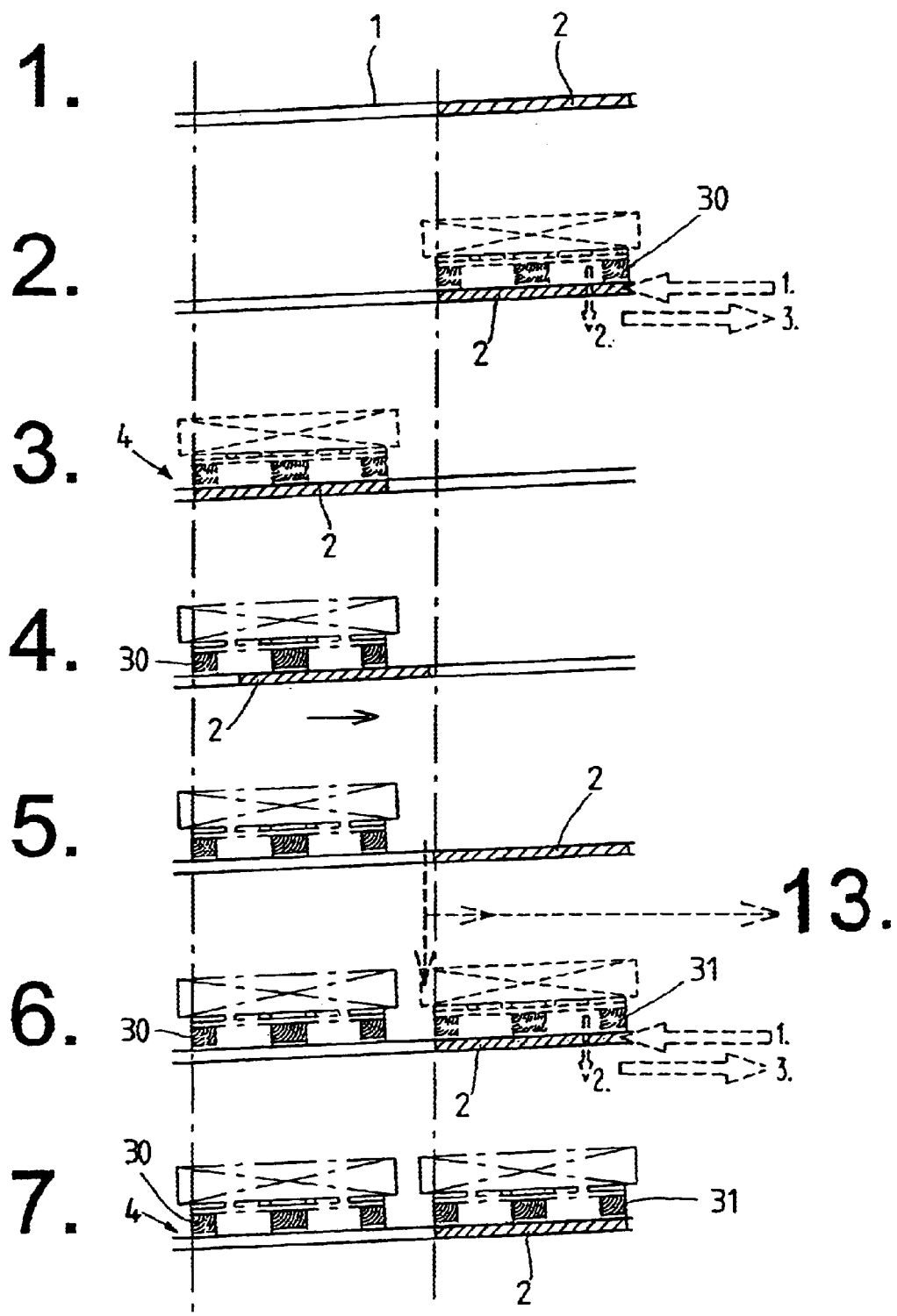
FIGS. 7a and 7b illustrate the sequence of events for delivering large containers by means of an inventive apparatus using a two-pallet system.
Figure 7B:
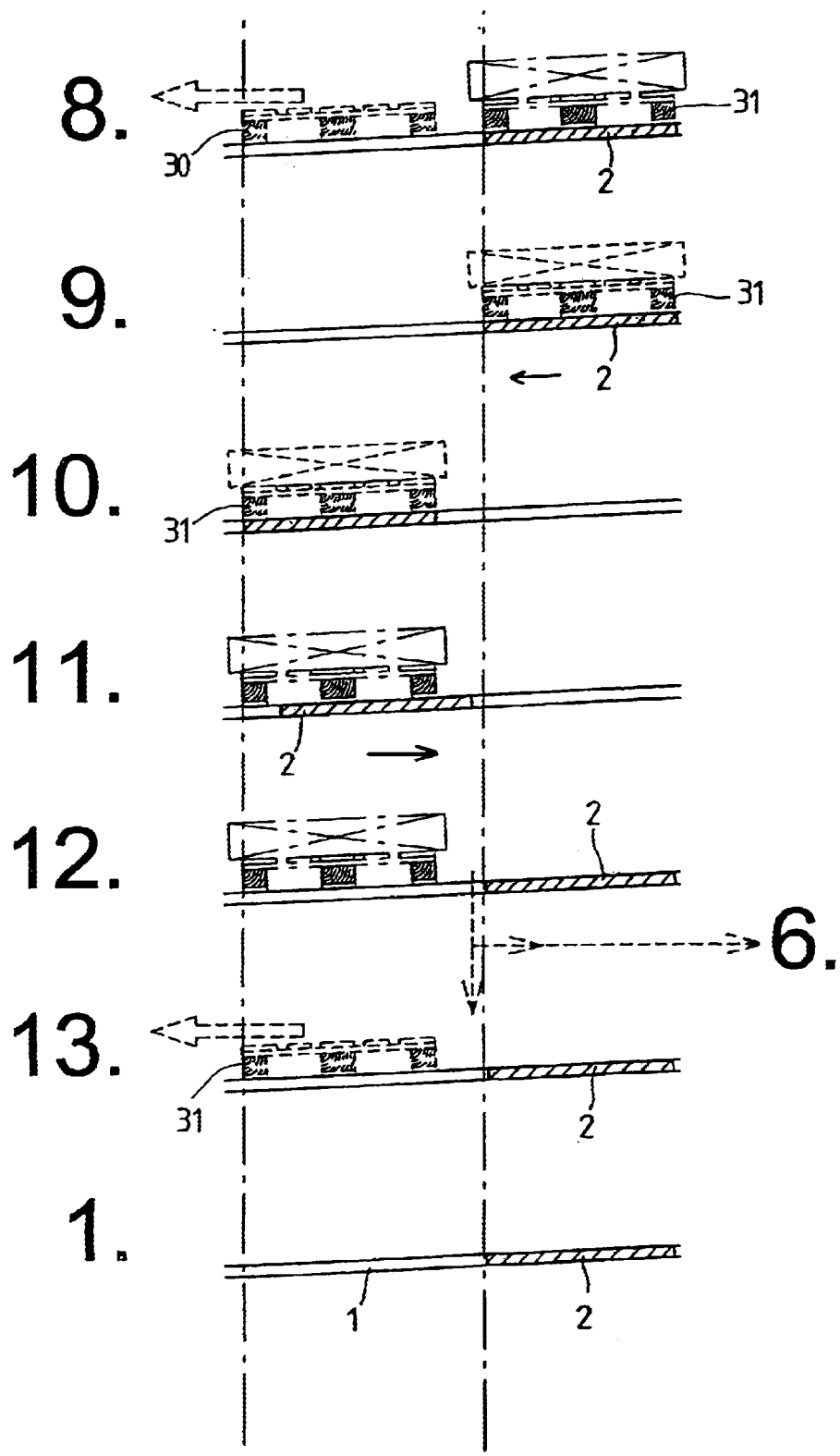

FIGS. 7a and 7b illustrate the sequence of events for delivering large containers by means of an inventive apparatus in a two-pallet system. A two-pallet system is a system in which, while one pallet is located in the transfer or out-processing station, another pallet can be delivered to the apparatus and remains in a wait position in the delivery segment. FIGS. 7a and 7b illustrate the delivery process using 13 different steps. The inclined delivery segment 1 is schematically shown for each of the steps.

In step 1, at the beginning of the method, a cart pair 2 is located in a starting position at the upper end of the inclined delivery segment 1. In step 2, a first pallet 30 is placed on the cart pair. This can be done, for instance, using an article handling device, as indicated by the dashed-line arrow. The RBG with the pallet 30 moves in the direction of the cart pair 2 located in the starting position, lowers the pallet and places it onto the conveyor means 2, and is then withdrawn, without the pallet, from the area of the delivery segment.

The gravity exerted by the pallet 30 now causes the cart pair 2 to move along the inclined delivery segment 1 in the direction of a transfer or out-processing station 4.

As illustrated, in method step 3 the cart pair 2 with the pallet 30 thereupon arrives at the transfer or out-processing station. Now the pallet 30 is moved to a deposit device and a restoring force drives the cart pair 2 back to the starting position. This is illustrated in method step 4.

In step 5, the pallet 30 is on a deposit device in the transfer or out-processing station 4, and the cart pair 2 has arrived at its starting position. As indicated by the alternate arrow, step 13 can immediately follow step 5 as illustrated. Step 13 will be described later.

Step 6 occurs if step 13 does not follow step 5. An RBG places another pallet 31 onto the cart pair 2 located at the starting position. The cart pair 2 with the pallet 31 thereupon does not move at all or moves only slightly in the direction of the transfer or out-processing station because the latter is still occupied by the pallet 30.

Step 8 shows that the pallet 30 that is still located on the deposit device has been completely out-processed and removed from the system. Alternatively, the pallet can have been transferred to a transfer station. Now step 9 begins; as shown, the gravity of the pallet 31 causes the cart pair 2 with the pallet 31 thereupon to move in the direction of the transfer or out-processing station. Once there, the pallet 31 is moved to the deposit device (step 10), which is now unoccupied, and the cart pair 2 returns to its starting position in a manner analogous to step 4.

Once it arrives there the cart pair 2 is ready to receive another pallet. This is illustrated in step 12. Then, as indicated by the alternate arrow, step 6 can follow, whereby another pallet, other than the pallet 31 illustrated in step 6, can be placed on the cart pair 2. Alternatively, step 13 can occur, in which step the pallet 31 (or the pallet 30, if step 13 immediately follows step 5) is completely out-processed and removed from the system or transferred. Now the method has returned to its starting situation.

Of course the pallet next placed at the starting position of the cart pair 2 can be removed from the delivery segment in reverse during any method step. This can be done, for instance, with an RBG. For instance, the RBG can use a forklift to reach into the intermediate space left between the tracks for the carts of the cart pair 2 and take the pallet. Thus, for instance, a pallet that has not been completely emptied can be returned to storage from the out-processing station if this is necessary.

Figure 8A:
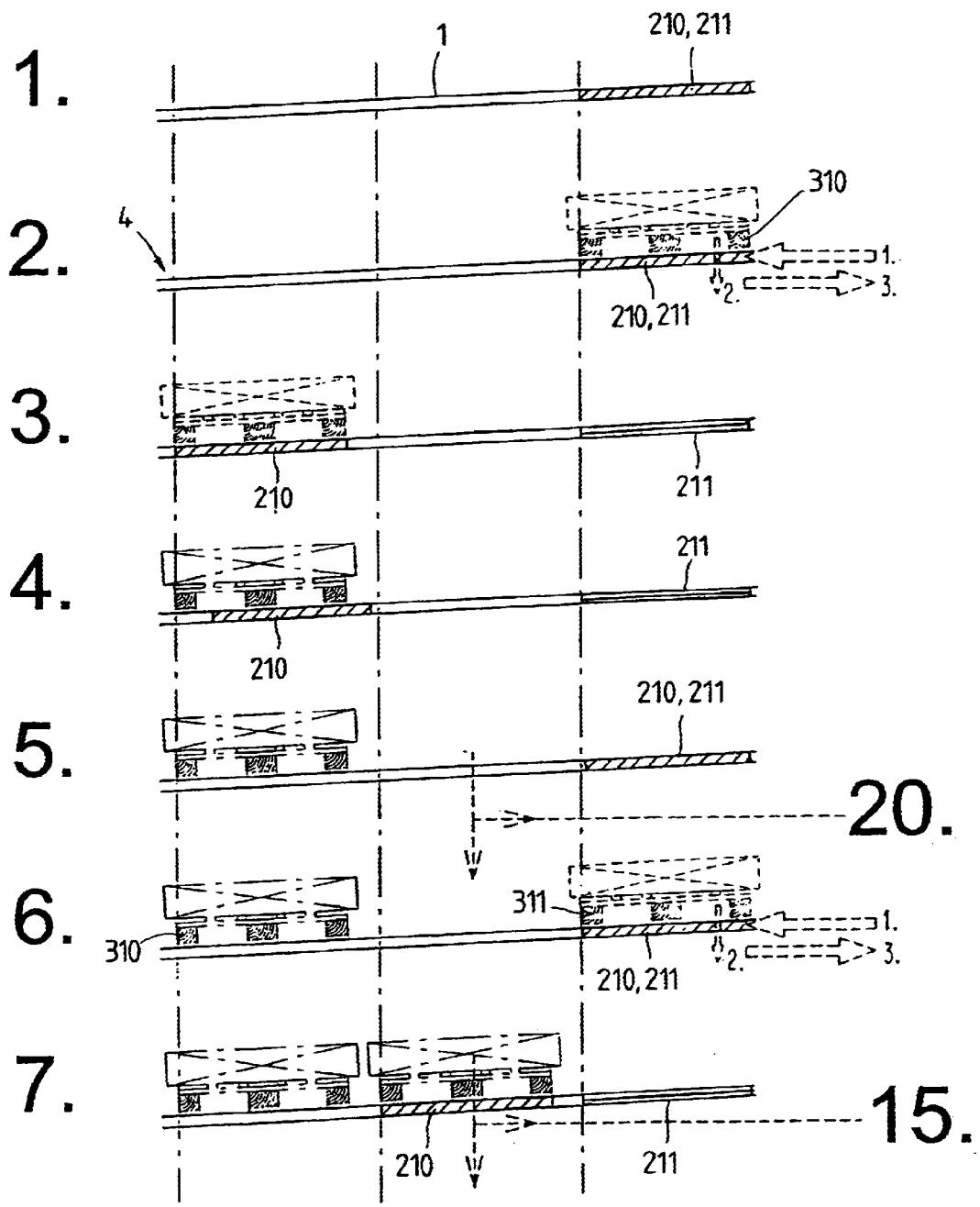
FIGS. 8a through 8c illustrate the sequence of events for delivering large containers by means of an inventive apparatus in a three-pallet system.
Figure 8B:
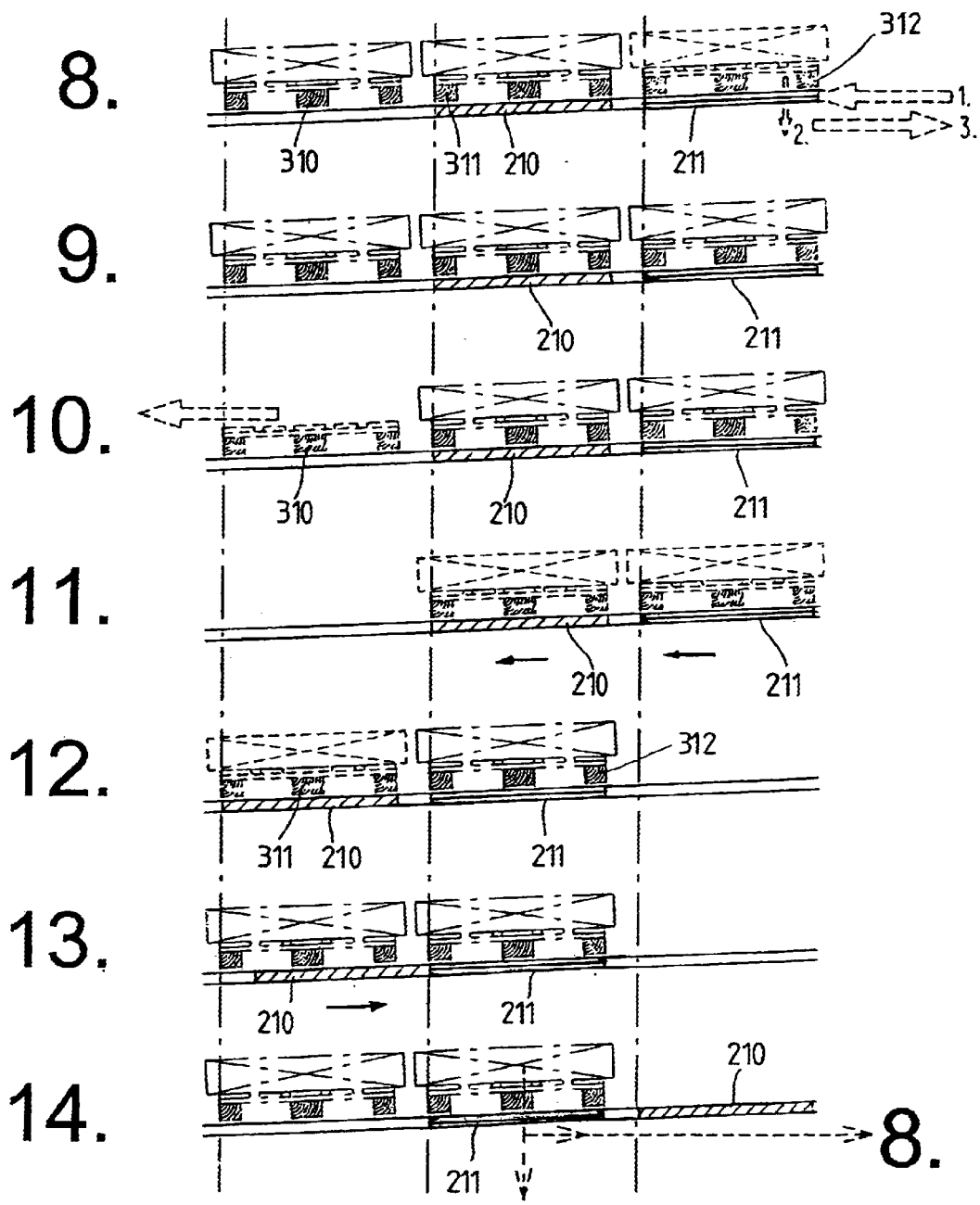
Figure 8C:
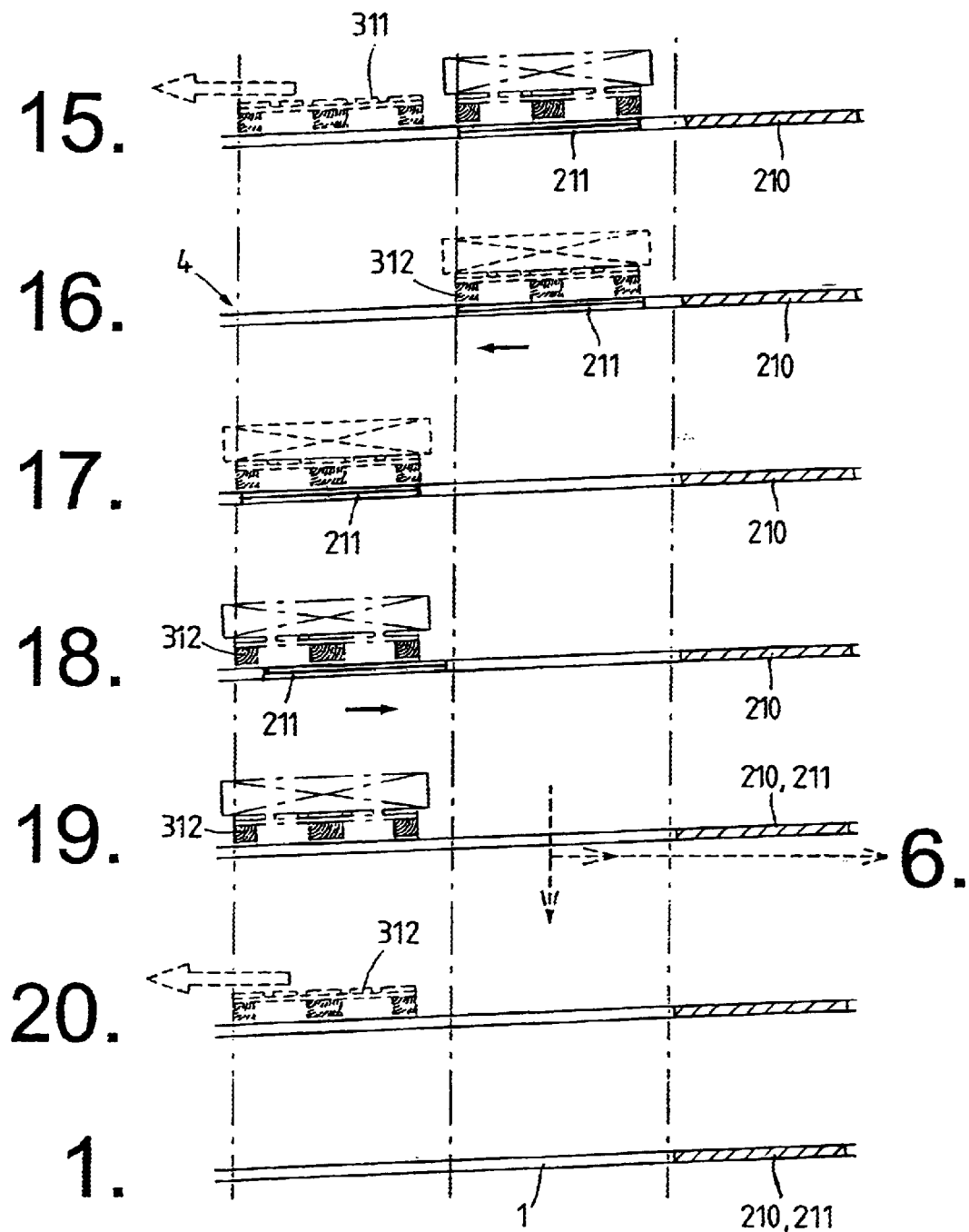

FIGS. 8a through 8c illustrate individual steps in the delivery process for a three-pallet system. A three-pallet system should be understood to mean a system in which, in addition to a pallet located in the transfer or out-processing station, two additional pallets can be placed in successive wait positions along the delivery segment. In contrast to the method of delivery described above, illustrated in FIGS. 1a and 1b, two cart pairs 210 and 211 are provided in the delivery segment 1 in the method of delivery for a three-pallet system illustrated here.

At the beginning of the method, illustrated in step 1, both cart pairs 210 and 211 are shown at the beginning of the delivery segment 1 in the starting position. Cart pairs 210 and 211 are distinguished in that only cart pair 210 can receive a pallet when both cart pairs are in the starting situation. Cart pair 211 cannot receive a pallet until cart pair 210 is not located in the starting position.

As illustrated in step 2, an RBG, for instance, places a pallet 310 onto the cart pair 210. The gravity exerted by the pallet then causes the cart pair 210 to move along the inclined delivery segment 1 in the direction of the transfer or out-processing station 4 until the pallet 310 finally arrives at the transfer or out-processing station, as shown in step 3.

Now the cart pair 210 moves the pallet onto a deposit device, and the cart pair 210 returns to its starting position, as shown in step 4, driven by a restoring force. The cart pair 211 has remained in its starting position during all of these enumerated method steps.

As illustrated in step 5, only the first pallet 310 is moved onto the deposit device in the transfer or out-processing station 4, and if the two cart pairs 210 and 211 are back in the starting position, step 20 (described later) can now occur immediately, as indicated by the alternate arrow. However, if step 6 occurs now, another pallet 311 is placed, for instance by means of an RBG, onto the cart pair 210 located at the beginning of the delivery segment 1 in the starting position.

The gravity of the pallet 311 now causes the cart pair 210 to again move in the direction of the transfer or out-processing station. However, since the transfer or out-processing station is still occupied by the pallet 310, the cart pair 210 with the pallet 311 placed thereupon moves only to a wait position in front of the transfer or out-processing station, as illustrated in step 7. The cart pair 211 is still in its starting position.

After the illustrated step 7, the method can jump ahead directly to step 15, which is described later. Otherwise step 8 occurs, in which a pallet 312 is again brought to the delivery segment 1, for instance by means of an RBG. The third pallet 312 is now placed onto the cart pair 211 still located in the starting position. The delivery segment 1, including the transfer or out-processing station 4, is now occupied by three pallets and is thus completely full. The cart pair 211 with the pallet 312 placed thereupon does not move, or moves only slightly, in the direction of the transfer or out-processing station because the delivery segment in the direction of the transfer or out-processing station 4 is already occupied by two pallets.

As illustrated in step 10, if the first pallet 310 is now completely out-processed and removed from the system or if it is transferred, both cart pair 210 and cart pair 211 can be driven by the gravity of pallets 311 and 312, respectively, in the direction of the transfer or out-processing station 4. The cart pair 210 with the pallet 311 placed thereupon reaches the transfer or out-processing station and moves the pallet onto a deposit device there.

The cart pair 211 with the pallet 312 placed thereupon occupies the wait position formerly occupied by the cart pair 210. This is illustrated in step 12. If the pallet 311 is moved onto the deposit device, the cart pair or conveyor means 210 returns to its starting position driven by the restoring force, as illustrated in step 13. Once it arrives there it is ready to receive a pallet, as shown in step 14.

The method can jump to step 8, as indicated by the alternate arrow; however, the designations for cart pairs 210 and 211 should be switched in this and subsequent steps.

If the method now continues with the next step (15), as illustrated, the next pallet 311 deposited onto the deposit device is completely out-processed and removed or transferred from the system. In this case, the cart pair 211 with the pallet 312 placed thereupon moves in the direction of the transfer or out-processing station 4 driven by the gravity of the pallet 312. Step 16 illustrates this. As illustrated in step 17, the cart pair 211 now moves the pallet 312 onto the deposit device. Then a restoring force causes the cart pair 211 to return without the pallet 312 to the starting position. As illustrated in step 19, both cart pairs 210, 211 are now again in the starting position and one pallet 312 is located in the transfer or out-processing station.

At this point, the method can continue as illustrated in step 6, which is again indicated by the alternate arrow, i.e., another pallet can be placed on a cart pair, namely the cart pair 210, or the method continues in step 20. Step 20 illustrates that the only pallet 312 located in the transfer or out-processing station 4 (or pallet 310, if step 20 immediately follows step 5 directly) is completely out-processed and removed from the system or transferred. Now the method has returned to the starting situation illustrated in step 1.

Even in the method illustrated in FIGS. 8a through 8c it is of course possible to retrieve from the system the rearmost pallet, for instance by means of an RBG. The RBG can for instance use a forklift to reach into the intermediate space between the tracks for the carts and take a pallet. Thus, for instance, a pallet that has only been half emptied can be retrieved from the transfer or out-processing station by means of an RBG.

The specification incorporates by reference the disclosure of European priority document 00 110 883.6 of May 23, 2000 and German priority document 101 16 164.6 of Mar. 31, 2001.

The present invention is, of course, in no way restricted to the specific disclosure of the specification and drawings, but also encompasses any modifications within the scope of the appended claims.

What I claim is:

1. An apparatus for delivering large containers of goods to an out-processing or transfer station said apparatus comprising:
    an inclined delivery segment that leads to said out-processing or transfer station, wherein said inclined delivery segment is provided with at least two tracks that are disposed essentially parallel to one another while leaving an intermediate space between them; and
    at least two carriages, which form a carriage pair and run on wheels, wherein each carriage is disposed in one of said tracks for movement there along, wherein each of said carriages is provided with a bearing surface, and wherein a large container can be placed upon said bearing surface of said carriage pair and wherein each of said carriages is provided with a base element, on which said wheels are disposed, and a carrier element, which is displaceable relative to said base element and on which said bearing surface is disposed, wherein corresponding adjustment members are disposed on said base element and said carrier element, and said adjustment members are movable relative to each other in response to longitudinal movement of said carriage along the direction of said tracks, wherein the height of said bearing surface is adjusted by said adjustment members.

2. An apparatus according to claim 1, wherein said intermediate space between said tracks is dimensioned such that for retrieving a large container from said out-processing or transfer station, a transport means can access said intermediate space and engage said large container.

3. An apparatus according to claim 1, wherein a deposit device is disposed in said out-processing or transfer station for deposit of a large container.

4. An apparatus according to claim 1, wherein a height of each of said bearing surfaces is adjustable in distance relative to said wheels of said carriages.

5. An apparatus according to claim 4, wherein a deposit device having a deposit surface is disposed in said out-processing or transfer station for deposit of large containers, and wherein said bearing surfaces of said carriages can be lowered in said out-processing or transfer station to below a level of said deposit surface of said deposit device.

6. An apparatus according to claim 1, wherein said tracks are formed by U-shaped profiled tracks having a base and two essentially parallel legs that are disposed essentially perpendicular to said base, and wherein said wheels of said carriages run on said base.

7. An apparatus according to claim 6, wherein said legs of said U-shaped profiled tracks have outwardly angled bevels that form a deposit device for a large container.

8. An apparatus according to claim 7, wherein said bearing surfaces of said carriages are adjustable in height between a lowered position and a raised position, and wherein in said lowered position said bearing surfaces are below said bevels of said legs, and in said raised position said bearing surfaces are above said bevels of said legs.

9. An apparatus according to claim 1, wherein a length of said inclined delivery segment is equal to at least twice a length of a large container that is to be delivered using said apparatus.

10. An apparatus according to claim 1, wherein two additional carriages are provided that form a second carriage pair and are disposed in said tracks or in additional tracks disposed adjacent to said first tracks, and wherein said additional carriages each have wheels and bearing surfaces for receiving a large container.

11. An apparatus according to claim 1, wherein said carriages are connected to a retrieval means that exerts a force on said carriages in opposition to the force acting on said carriage in the direction of the downward slope of said track due to gravity, and wherein said retrieval means returns said carriages, without a large container placed thereupon, to a starting position at a beginning of said tracks.

12. An apparatus according to claim 11, wherein said retrieval means is in the form of at least one spring that is connected to said beginning of said track as well as to a respective one of said carriages.

13. An apparatus according to claim 12, wherein said spring is a helical spring.

14. An apparatus according to claim 1, wherein incline adjustment means are provided for adjusting an incline of said tracks.

15. An apparatus according to claim 14, wherein said incline adjustment means is in the form of spring-elastic compressible support means disposed at a higher beginning end of said tracks.

16. An apparatus according to claim 1, wherein, with respect to each of said carriages, said adjustment members thereof guide said carrier element thereof along a predetermined path of movement between a lowered position and a raised position during displacement of said carrier element relative to said base element thereof and wherein, during movement of each respective carriage along a predetermined extent of its respective track, said carrier element and said base element thereof travel at the same speed relative to the respective track, and said apparatus further comprises means for engaging each of said carriages upon completion of its movement along the predetermined extent of its respective track in a manner which effects a decrease in the speed of said base element thereof relative to the speed of said carrier element thereof and, with respect to each of said carriages, said adjustment members thereof are operable to guide said carrier element thereof between a respective one of its lowered and raised positions into the other of its lowered and raised positions in response to the decrease in the speed of said base element relative to the speed of said carrier element.

17. An apparatus for delivering large containers of goods to an out-processing or transfer station said apparatus comprising:

- an inclined delivery segment that leads to said out-processing or transfer station, wherein said inclined delivery segment is provided with at least two tracks that are disposed essentially parallel to one another while leaving an intermediate space between them; and
- at least two carriages, which form a carriage pair and run on wheels, wherein each carriage is disposed in one of said tracks for movement there along, wherein each of said carriages is provided with a bearing surface, and wherein a large container can be placed upon said bearing surface of said carriage pair wherein each of said carriages is provided with a base element, on which said wheels are disposed, and a carrier element, which is displaceable relative to said base element and on which said bearing surface is disposed, wherein slide members, each of which has an inclined face, are disposed on said base element and said carrier element and one another, and wherein when said base element and said carrier element are displaced relative to one another, a height of said bearing surface is adjusted.

18. An apparatus for delivering large containers of goods to an out-processing or transfer station said apparatus comprising:

- an inclined delivery segment that leads to said out-processing or transfer station, wherein said inclined delivery segment is provided with at least two tracks that are disposed essentially parallel to one another while leaving an intermediate space between them, and
- at least two carriages, which form a carriage pair and run on wheels, wherein each carriage is disposed in one of said tracks for movement there along, wherein each of said carriages is provided with a bearing surface, and wherein a large container can be placed upon said bearing surface of said carriage pair, wherein a height of each of said bearing surfaces is adjustable in distance relative to said wheels of said carriages and wherein each of said tracks has a first end and a second end, and wherein a respective stop is disposed at said first end and at said second end and serves to trigger an adjustment in the distance of said bearing surfaces of said carriages relative to said wheels thereof when said carriages strike said stops.

19. An apparatus for delivering large containers of goods to an out-processing or transfer station said apparatus comprising:

- transfer station, wherein said inclined delivery segment is provided with at least two tracks that are disposed essentially parallel to one another while leaving an intermediate space between them; and
- two carriages which form a first carriage pair and run on wheels, wherein each carriage is disposed in one of said tracks for movement there along, wherein each of said carriages is provided with a bearing surface; and
- two additional carriages are provided that form a second carriage pair and are disposed in said tracks or in additional tracks disposed adjacent to said at least two tracks, and wherein said additional carriages each have wheels and bearing surfaces for receiving a large container and wherein said bearing surfaces of said carriages that form said first carriage pair, and said bearing surfaces of said carriages that form said second carriage pair, are each adjustable in height between a raised and a lowered position with respect to said wheels of said carriages, and wherein said bearing surfaces of said carriages of said first carriage pair are higher in their raised position than are said bearing surfaces of said carriages of said second carriage pair in their raised position.

* * * * *